Oct. 4, 1966 A. SERAGNOLI 3,276,564
MECHANISM FOR FEEDING PAIRS OF ARTICLES INTO A MACHINE
Filed July 31, 1964 4 Sheets-Sheet 1

Inventor
Ariosto Seragnoli,

By Watson, Cole, Grindle & Watson
Attorneys

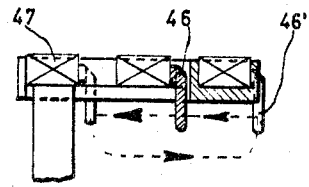
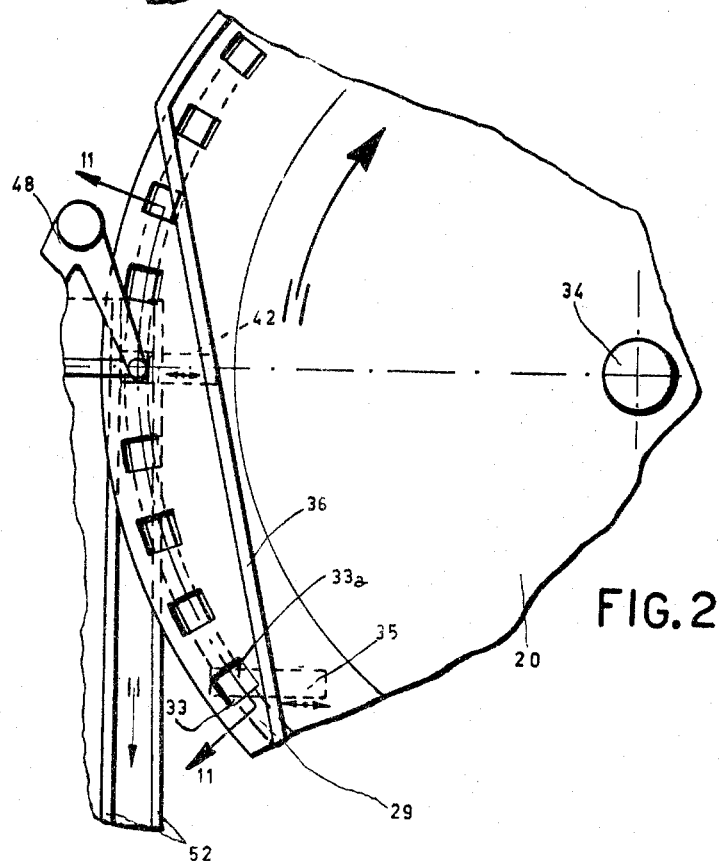
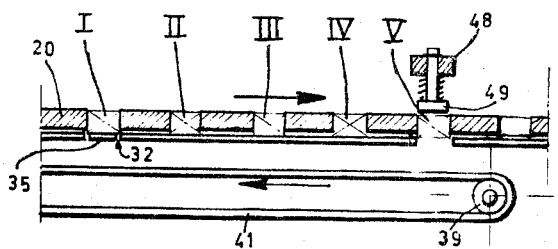

United States Patent Office 3,276,564
Patented Oct. 4, 1966

3,276,564
MECHANISM FOR FEEDING PAIRS OF ARTICLES INTO A MACHINE
Ariosto Seragnoli, Via Pomponia 10, Bologna, Italy
Filed July 31, 1964, Ser. No. 386,516
Claims priority, application Italy, Aug. 3, 1963, 16,711/63
8 Claims. (Cl. 198—30)

There are known mechanisms of different types for feeding pairs of articles into a machine, for instance, a wrapping machine. However, the devices as known hitherto do not operate in a satisfactory manner insofar as they do not remove from the feeding line the defective articles and make sure that the machine is always reached by paired articles.

Moreover, the present invention is particularly convenient insofar as it balances the output of the distributing mechanism and the input of the machine being fed, which mechanism and machine are thus able to be operated by independent motors, so as to render the plant convenient from a practical point of view.

The invention in the accompanying specification and drawings is disclosed by way of example, without any limitation, by having reference to a preferred form of embodiment, in which drawings:

FIG. 2 is a partial view from above of a detail on an enlarged scale;

FIG. 4 is a diagrammatical section developed according to line 11—11 of FIG. 2;

FIG. 7 is a section according to line 12—12 of FIG. 6;

Figure 1:
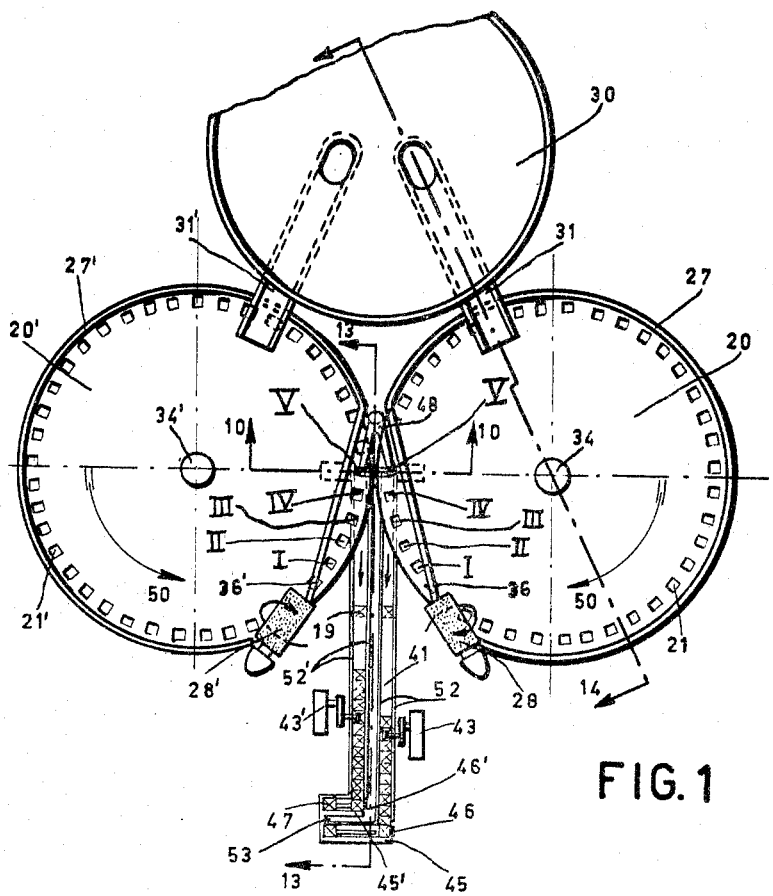
FIG. 1 is a diagrammatical view from above of the mechanism.

The mechanism is carried by bases not shown, onto which there are fastened the stationary parts and in which there are guided the movable parts by usual means which are not disclosed nor illustrated in the drawings.

The mechanism comprises two discs 20, 20′ carried by and rigidly connected to shafts 34, 34′ having a substantial vertical axis rotatably mounted in said bases.

The shafts 34, 34′ are moved intermittently and synchronously rotated, for instance, by a Geneva wheel and by a gear coupling for the shafts thus causing the discs to rotate.

The discs 20, 20′ are identical between each other and they cooperate each with identical elements and with identical work stations which are symmetrically arranged with respect to line 13—13 of FIG. 1. For simplicity's sake the description is limited to disc 20, to the elements cooperating therewith and to the respective work stations.

The disc 20 on the periphery is provided with a plurality of uniformly spaced holes 21, each of which consecutively stops in the stations I, II, III, IV and V as indicated in the figure.

Every hole is disposed in such a way as to receive and wholly contain an article.

On a part of the periphery of the disc and above the disc itself there is disposed an enclosure 27 intended to enclose a part of the surface of said disc including the holes 21. The enclosure 27 in the part 36 is bent towards the axis of the disc so as to leave outside the enclosure the aforesaid stations. Said enclosure forms with the disc 20 a basin intended to receive in bulk the articles 19 to be fed by pairs into a machine. The disc rotates in the direction of arrow 50.

In the area in which the disc passes under the inside extending part 36 of the enclosure, there is provided a rotating brush 28 which pushes towards the inside of the disc the articles which have been unable to locate themselves into the holes.

The disc is preferably raised at the centre so that the articles to be distributed, which are charged in bulk on said disc, dispose themselves on the peripheral areas overlying the holes 21.

During the intermittent rotation of the disc the articles are then caused to drop into the holes and to place themselves therein, each article withdrawn from the heap of articles introduced in bulk into the charging basin being wholly arranged within a hole and filling it completely. When passing under the brush 28, every hole brings an article out of the enclosed area.

Beneath the disc there is arranged a stationary support 29 for the articles housed in the holes which prevents them from dropping down.

The introduction of the articles in bulk into the enclosed areas on the discs is performed in any known manner.

Figure 8:
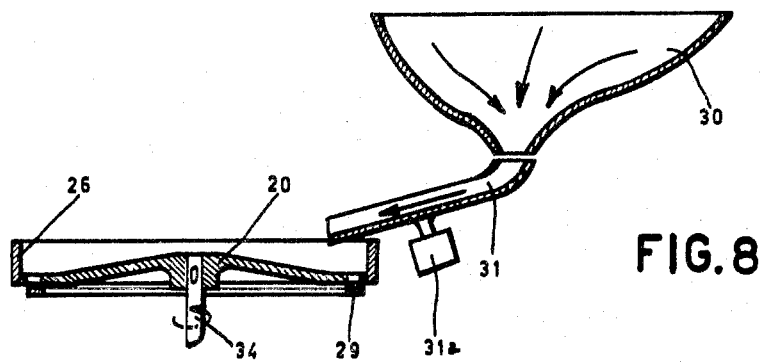
FIG. 8 is a section according to line 14—14 of FIG. 1.

For example in FIGS. 1 and 8 there is illustrated a charging hopper 30, from which towards the disc 20 a discharging channel 31 is branched off, which is caused to vibrate by vibrator 31a resulting in the articles falling from the hopper to the disc.

On every disc there is provided in a known manner and according to known methods a sensitive element (not shown) which feels the thickness of the layer of articles and which, upon the thickness reaching predetermined maximum and minimum sizes, respectively stops and starts again the run of the vibrator, so as to maintain on said disc the desired load of articles to be distributed.

The station I is a check station for discarding the defective articles. In this station (FIGS. 2 and 4) the suppport 29 is discontinued so as to leave in coincidence with the position as assumed by a hole 21 when it stops in said station, a hole 32 situated thereunder, whose outline is placed under the outline of the overlying hole 21 with the edges 33, 33a protruding inside.

During the movement of the disc said waste material hole 32 is closed by a shutter 35 which by conventional means (not shown) is removed from the hole every time a hole 21 has stopped in said station I. The shutter 35 is then caused to again close the hole 32 before the disc starts moving again.

In the station V beneath the disc and at a distance from the lower edge of said disc, slightly greater than the height of the articles to be distributed, there is provided a belt 41 wound on a driving pulley 39 and a idle pulley, which members are guided in said stationary base and operated by conventional means (not shown), said belt moving with the upper branch in the direction of the arrows on said belts in FIGURE 1.

Belt 41 is preferably of such a width as to convey the articles delivered from both the discs 20, as shown in the drawing: alternatively there may be provided two belts, one for each disc.

In said station V the support 29 is discontinued, so as to allow the articles to fall from the hole 21 onto the belt 41 when the hole stops in said station V.

Between the disc and the belt 41 there is provided a tongue 42 capable of assuming two positions.

Figure 3:
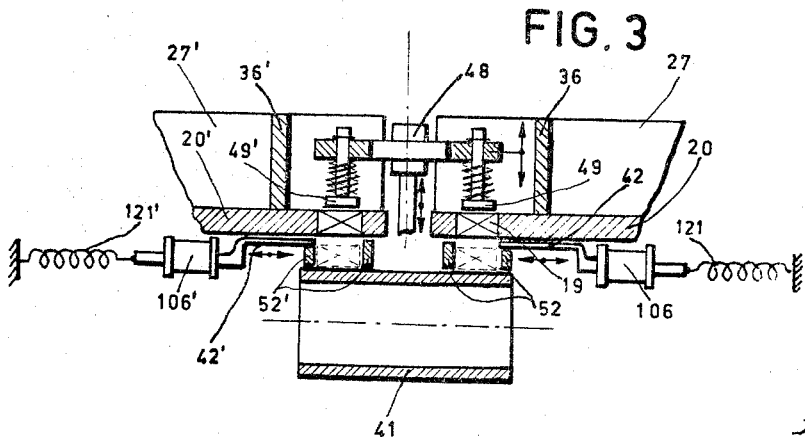
FIG. 3 is a diagrammatical partial section according to line 10—10 of FIG. 1.
Figure 5:
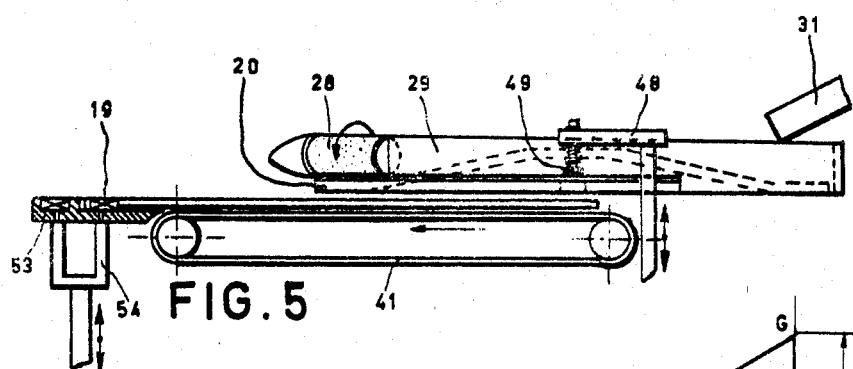
FIG. 5 is a section according to line 13—13 of FIG. 1.

In a position marked by a dashed line in FIG. 2 said tongue is situated in the space in which support 29 is interrupted and restores the continuity of the bearing so as to prevent the articles 19 from dropping down; in the other position, shown in FIGURE 3, the tongue is retracted out of the interruption.

The tongue 42 is operated by an electromagnet 106 which, upon being energized, pushes the tongue into the interruption of the support 29, by overcoming the return force of a stretched spring 121.

Upon the electromagnet 106 being de-energized, the spring 121 pulls out the tongue 42, so as to cause it again to assume the position as shown in FIG. 3

In the said station V there is operated also a vertically reciprocating expeller 48 provided with a resiliently arranged head 49 which, when the disc 20 is moving, is positioned on the top as shown in FIG. 3, outside said discs and, when the disc stops, moves down to resiliently press upon the article contained in the hole 21, whereupon it ascends again into the position as shown in FIG. 3 before the movement of the disc starts again.

An identical resilient head carried by the expeller 48 is provided for the disc 20', as shown.

Figure 10:
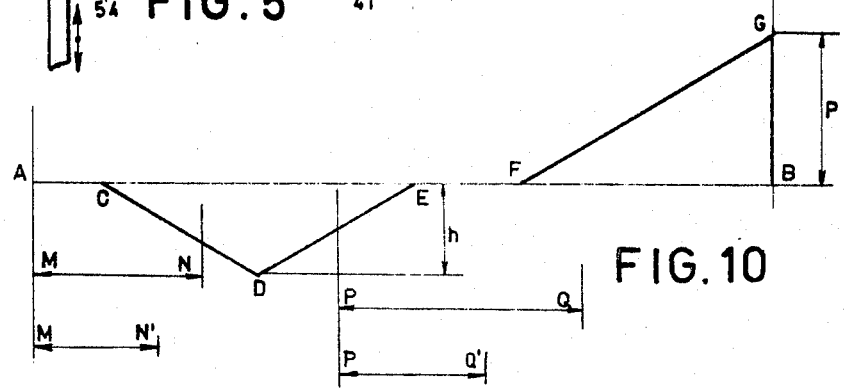
FIG. 10 is a diagram of the phases of movement of a few parts and of the interlocking mechanisms.

FIG. 10 shows the vertical displacement of head 48 and the rotations of disc 20 as a function of time. The length AB, represents the duration of a cycle. There are shown the phases CD and DE respectively of descent and reascent of the expelling head 48, whose stroke is indicated in $h$; the phase of rotation FG of disc 20, indicating with $p$ the peripheral pitch of the holes; the intervals MN and PQ in which there are admissible respectively the outlet and the inlet of the tongue 42 from/into the corresponding interruption of the support 29, so as to have noninterferences at the moment of the articles dropping down or an impossibility of satisfactory working of the expeller 48.

The movement of the tongue 42 is imparted in such a way as to permit the same to move only in the phases and in the manner as stated hereinbefore, by means of two cams 122, 123 performing a revolution at every cycle. The cam 122 acts upon an electric switch 126 and keeps it closed during the time PG' and open during the whole remainder of the cycle, the time Q'Q being sufficient for causing the tongue 42 to enter the interruption of the support 29. The cam 123 acts upon an electric switch 127 by keeping it open during the time MN' and closed for the whole remainder of the cycle, the time M'N being sufficient for causing the tongue 42 to retract from the interruption of the support 29. The working will be disclosed hereinafter.

The support 29 extends beneath the whole circumference of the holes 21, showing only those interruptions mentioned above in connection with stations I and V.

On the belt 41 there are provided a pair of walls 52 which, together with the upper branch of the belt, form a conveying channel for the articles.

An identical channel is formed by other two walls 52' for the disc 20', as shown.

The belt 41 conveys the articles that reach it beneath two sensitive elements 43, 43' shown only in FIG. 1, one for each channel, and beyond the said sensitive elements as far as to reach a small plate, where they are stopped against the catches 45, 45', one for each channel, and staggered the one with respect to the other.

The said sensitive elements 43, 43' are raised by the articles passing under them, falling down on the belt 41 when beneath the same elements there are no articles 19. When raising or lowering the sensitive elements operate electric switches 37, 37', 38, 38', 130, 130', so that the first two of said switches are closed and the last four are open when beneath the corresponding sensitive elements there are situated articles 19 and vice-versa.

Figure 6:
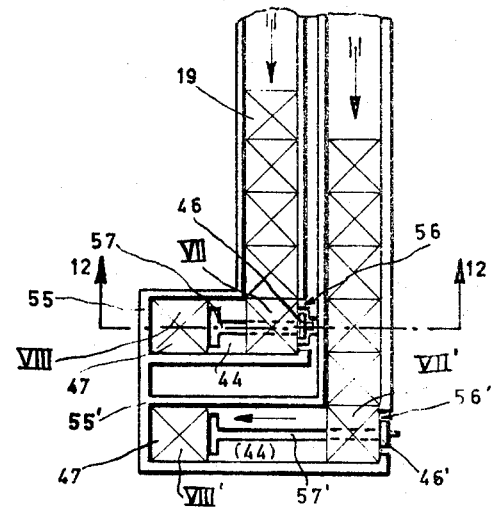
FIG. 6 is a view from above of a detail on an enlarged scale.

Transversely to the plate 44 there operate periodically the pushers 46, 46' guided in the said base in such a way as to follow the trajectory shown by dash and dot lines in FIG. 7, from station VII to station VIII and backward. In the stations VII and VII' they are aligned with the articles 19 held by the stops 45 and 45', respectively; in the positions VIII and VIII' they are arranged side by side, FIGURE 6.

When moving the conveyors carry the articles 19 as far as to reach the stop boards 55, 55'.

The conveyors when moving pass into corresponding free spaces 56, 56' of the walls 52, 52' and into slots 57, 57' of the small plate 44.

The stroke of the two conveyors is different so that, when starting from different initial points, they are pushing the articles to be distributed side by side into the stations VIII and VIII'.

As shown in FIG. 7, when advancing from the left to the right, the fingers of the conveyors move parallel to the small plate and when returning from the right to the left, they are lowered and move back into the initial position by passing under the articles which advance on the small plates upon being pushed by the belts 41.

In the stations VIII, VIII' under the small plate there is provided an elevator 54 having two arms and a reciprocating vertical motion, which passes into corresponding holes of the small plate. Said elevator is operated in such a way as to move upwards within the holes of the small plate 44 and to deliver the articles 19 contained in the stations VIII, VIII' to a machine in phase with the movement of said machine and in the right movement and with the movement of the conveyors 46, 46', so as to move upwards in a period of time in which the aforesaid conveyors are not delivering articles towards the aforesaid stations VIII, VIII'.

Thus, the working speed of the conveyors and of the elevator, is identical to that of the machine to be fed. The working speed of the distributing discs instead is such that, even if there are no waste materials and empty holes, they deliver a quantity of articles slightly smaller than the input of the machine to be fed. The mechanism, as it will be seen later on, is arranged in such a manner as to automatically compensate the differences between the output of the distributing discs and the input of the machine to be fed.

All of the above described parts are connected and interlocked, both mechanically and electrically, in a conventional way, so as to perform the desired succession of operations.

Figure 9:
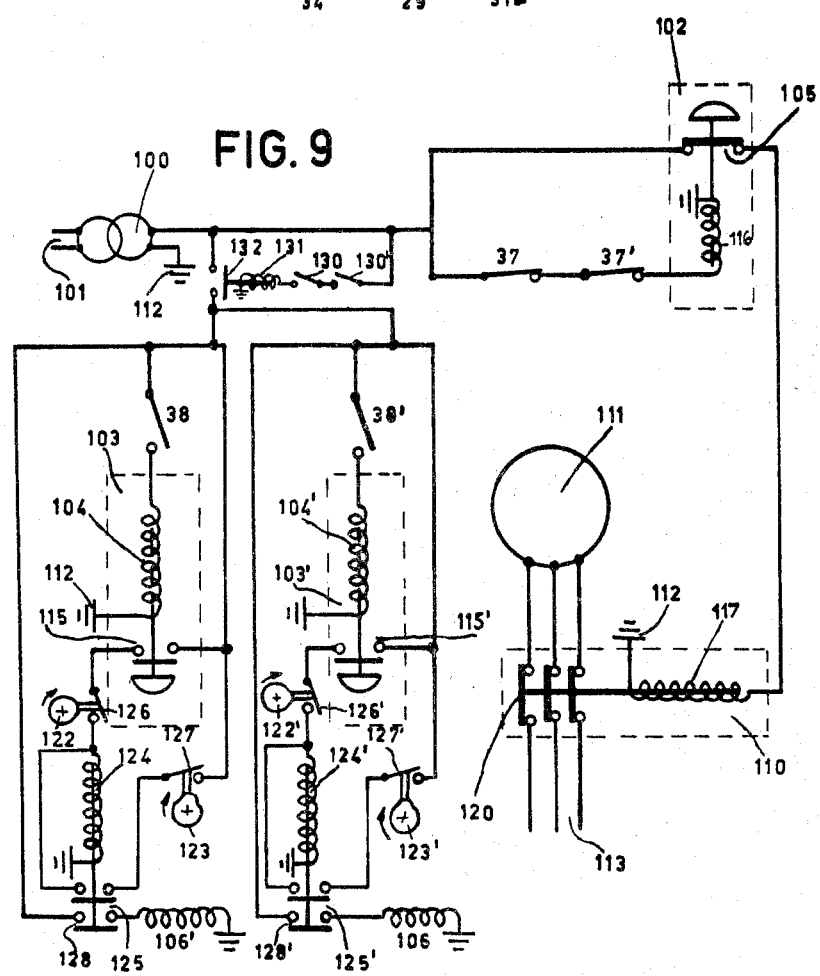
FIG. 9 is an electrical principle diagram of an interlocking mechanism for the various parts.

However, by way of example there is illustrated in FIG. 9 the principle of an electric diagram of a control circuit capable of realizing the control of the run of the mechanism, to make sure that the articles are always fed by couples into the machine to which they are intended to be delivered. In the said diaphragm reference numeral 101 denotes the coupling to the electric main, 100 is a transformer, 112 denotes the common return lead by which the sub-circuit of the transformer is closed. The reference numerals 37, 37'; 38, 38'; 130, 130' indicate switches operated by the sensing elements, each of the switches of the second and third groups being opened with the presence of articles beneath the corresponding sensing elements, and vice versa with their absence. A current line from the subcircuit of the transformer passes through the switches in series 37, 37' to the electromagnet 116 of a delay relay 102 and closes on the common lead. When said line is closed, the electromagnet 116 causes the delayed closure of the switch 105.

Another current line from the sub-circuit of the transformer passes through the switch 105 to the electromagnet 117 of a remote control switch 110 which, through the contacts 120, furnishes current of the network 113 to the motor 111 controlling the machine to be fed, thus causing the said motor and the said machine to run.

Another current line from the sub-circuit of the transformer through the switches in series 130, 130' feeds the relay 131 which, when it is energized, opens the contacts 132.

Another current line through contacts 132 reaches identical circuits of the electromagnets 106, 106' of the tongues 42, 42'. The second electromagnet circuit is described herewith. The current line through the switch 38 reaches the electromagnet 104 of a time-delay relay and closes on the common lead 112. The electromagnet 104, when energized, closes without delay the contact 115; when it is de-energized, opens the contact 115 with a predetermined delay capable of being regulated. Through the contacts in series 115 and 126 the current line passes also to the electromagnet 124 of another relay which, when it is excited, closes the contacts 125, 128 and, when it is de-energized, leaves them open.

The contact 125 serves for the self-excitation of the electromagnet 124, to which current is fed by the sub-circuit of the transformer through the switch 127; the contact 128 furnishes current to the electromagnet 106' of the tongue 42', whose circuit is closed on the common lead.

From the diagram of FIGURE 10 taken in connection with the said circuit it follows that by the combined action of the switches 122 and 123, of which there have already been disclosed the opening and closing phases, when the contact 38 is closed, the tongue 42' may enter the interruption of the support 29 only in the phase PQ and stays inside until switch 38 is closed.

Moreover, one sees that the tongue 42' is caused to move out only when the contact 38 has been left open, without intermittences, during a predetermined period of time and that under the control of switch 127 said outward movement in any case takes place within the phase MN.

The operation is as follows:

The articles introduced into the hopper 30 move down in bulk to discs 20, 20' and, owing to the slope of the flanks of the disc, arrange themselves in the peripheral area of said disc in the area situated above the holes 21. Owing to the intermittent movement of the discs the articles fall and arrange themselves one in each hole, in which they are wholly contained, the hole, thus filled up being unable to receive other articles.

The holes with the articles contained therein are caused, owing to the movement of the disc, to pass under the brush 28, reaching the outside of the enclosed area. When a hole stops in station I, the shutter 35 is retracted outside so as to uncover the profile of the hole 32 situated thereunder. If the article contained in the hole is safe, it rests on the bearing projections 33, 33a. If, instead, it is defective, the support on the aforesaid projections is not sufficient to sustain it, so that the article drops and is discarded.

Thereupon the hole 21 passes the intermediate stations II, III, IV and reaches the transfer stations V.

If the interruption of support 21 in station IV is not closed by the tongue 42, the article 19 contained in the hole is resiliently pushed down on the belt 41 provided thereunder, by the resilient expeller 49, descending in the manner already disclosed so as to make sure that the article is expelled through the hole of the disc and transferred to the belt 41.

If, instead, the tongue 42 is within the aforesaid interruption, the article 19 is prevented from dropping down and is caused to rest in its hole for two revolutions of the disc 20.

The articles 19 upon having reached the belt 41 are carried by said belt within the channels 52, 52' to the plate 44 and to stop against the corresponding stops 45, 45' in the positions VII, VII'.

The conveyors 46, 46' in phase with the elevator 54 and with the machine fed, convey the articles from the positions VII, VII' to the stations VIII, VIII', from which they are lifted by the elevator 54 and delivered by pairs to the machine fed.

To make sure that feeding always takes place by pairs, provision is made that in the channels 52, 52' there are always articles 19, which thus by the belt 41 are pushed as far as to reach the stops 45, 45' every time that the preceding article has been pushed forward in the station VIII, VIII' by the conveyors 46, 46' and that the latter are returned into the right hand side position, as shown in FIG. 7. To this end said conveyors have a time of movement and stay out of the sphere of movement of the article long enough to allow the following articles 19, pushed forward by belt 41, to reach the positions VII, VII'. To this end, the speed of belt 41 is chosen appropriately high. In this way all of the articles reaching the belt 41 are rapidly pushed along the channels 52, 52' against the stops 45, 45', so as to fill up the channels in the opposite direction towards the stations V, V'.

The condition that on the belt 41 there are always present articles pushed forward towards the positions VII, VII' is achieved by the electric circuit according to FIG. 9.

As long as on the channels 52, 52' there are articles which fill them up in the opposite direction with respect to the supports 45, 45' as stated above at least as far as beneath the sensitive elements 43, 43', the latter will be lifted, the switches 37, 37', are closed, the relay 110 is consequently closed and through the contacts 120 the electric current causes the motor 111 of the machine to be fed to run. The switches 38, 38' are open and also the contacts 115, 115' are open, the electromagnets 106, 106' are de-energized, the tongues 42, 42' are retracted and the articles distributed by the discs 20, 20' every time they reach the stations V, V' drop down on the belt 41 and are conveyed towards the stops 45, 45'.

As already stated, the capacity of the machine to be fed is greater than that of the distributor; moreover, there may occur a disparity in the delivery of the articles to the two channels 52, 52', either owing to waste material or because of improper operation of one of the discs. To compensate both of these differences, there is provided the said electric circuit which works in the following manner:

Let us assume that at a certain moment the row of articles that has formed at the end of the channel 52 has become shorter to such an extent as to cause the respective sensitive element 43 to drop down, so as to open the switch 37 and to close the switch 38.

The remote control switch 110 opens immediately and the machine to be fed stops. At the same time the relay 103 closes the contacts 115 and as soon as cam 122 closes contact 126, the electromagnet 106' of the disc 20' causes the tongue 42' to close the drop hole for the articles. Thus only the channel 52 is now supplied with articles.

In this way the articles keep on reaching only channel 52. After a little while they lift and keep lifted the sensitive element 43 which closes switch 37 and opens switch 38. After predetermined periods of time corresponding to the delays imposed by the relays 102 and 103, the machine to be fed starts again running and feeding of channel 52' is again taken up, by withdrawing the tongue 42' when cam 123 opens switch 127.

In the eventuality of one or a few articles passing beneath the sensitive element keeping it lifted for a short time the delayed relays, which are regulated for a period of time longer than the aforesaid short period, remain respectively closed (relay 102) and open (relay 103).

In this way the passage of single articles does not produce any effect.

When, owing to the input of the machine to be fed, which is greater than the output of the feeding mechanism, both of the channels 52, 52' become simultaneously empty under the sensitive elements 43, 43' and the latter drop down together, the contact in series 130, 130' will close simultaneouly, the relay 131 opens the contacts 132 and stops feeding the circuits of the electromagnets 106, 106', so that the tongues 42, 42' are prevented from entering the free spaces 29, 29' and the articles 19 keep on dropping down until the channels 52, 52' are again refurnished.

After that, upon the predetermined delay having elapsed, the machine to be fed starts again and so on.

It is apparent that the manner of working as described permits to compensate whatever want of equilibrium in the delivery of the articles from the discs to the respective channels as well as the difference between the yield of the feeding mechanism and the absorption of the machine to be fed, so as to permit a perfectly automatic working.

Having thus disclosed the invention by having reference to a preferred form of embodiment, it will be obvious for the experts of the art, after having understood the invention, that it is possible to introduce a number of alternate solutions and variations, without thereby departing from the spirit of said invention.

For instance, it is obvious:

That the discs with respect to the belt 41 may be disposed in a different manner, for instance staggered, instead of being placed one in front of the other, or arranged both of them side by side on the same part;

That the belts may be more than one;

That the electric circuits of switches and relays may be modified by replacing them with other equivalent circuits, for instance by disposing the switches in parallel, instead of in series and by correspondingly modifying the circuits so as to achieve the same effects.

I claim:

1. A mechanism for feeding pairs of articles into a machine, comprising two intermittently rotating distributing discs, a conveying channel for each of said distributing discs ending against a stationary stop, said stops being spaced from each other, a sensing element positioned above each of said channels for detecting the presence of articles in the end part of the channel, each of said sensing elements operating an electrical switch closed with the presence and opened with the absence of articles underneath said sensing element, electrically operated control tongues to regulate delivery of the articles from each distributing disc to the corresponding channel, delivery being interrupted by the closing of the switch of the sensing element of the opposite channel, transverse transfer means, operated syncronously with the machine to be fed, to deliver in a predetermined phase of the cycle of the machine, a pair of articles, picking up one article from each channel.

2. A mechanism according to claim 1, wherein said transverse transfer means is moved along a working stroke, in which it pushes a pair of articles toward the machine to be fed, and an idle return stroke, out of the sphere of movement of the articles.

3. A mechanism according to claim 1, wherein said transverse transfer means is a vertically alternating moving lift, working in phase with the machine to be fed.

4. A mechanism according to claim 1, wherein the distributing discs are operated by a motor independent from that of the machine to be fed, the input rate of the feeding mechanism being slightly less than that of the machine to be fed.

5. A mechanism according to claim 1, wherein each distributing disc has peripheral holes moving partly underneath an enclosure, forming with the disc a charging basin for the articles in bulk, and partly outside, there being provided suitable separating means between the two parts and in the part external to the enclosure there being arranged a check mechanism for the articles to discard defective articles.

6. A mechanism according to claim 1, wherein a resilient expeller is provided to push the articles from the holes of the discs to the conveying channels.

7. A mechanism according to claim 1, wherein the conveying channels are formed from a conveying belt, which constitutes the bottom thereof, and from stationary guiding walls.

8. A mechanism according to claim 1, wherein each conveying channel includes a further sensitive element for detecting articles operating three electrical switches, said sensitive element in one position closing the first and opening the second and third switches and in another position opening the first and closing the second and third said switches, said first switches being electrically connected in series and associated with said machine to be fed whereby said machine to be fed is stopped when at least one of said first switches is open and restarted after a predetermined time delay when all of said first switches are closed, each of said second switches operating the control tongue of the disc delivering articles to the other channel, and said third set of switches being electrically connected in series to control the current flow to said second switches whereby the current flow may be interrupted when both said third switches are opened cancelling the action of said second switches.

References Cited by the Examiner

UNITED STATES PATENTS

| | | | |
|---|---|---|---|
| 2,931,487 | 4/1960 | Frank | 198—37 |
| 3,135,373 | 6/1964 | Scarf | 198—103 |

EVON C. BLUNK, *Primary Examiner.*

RICHARD E. AEGERTER, *Examiner.*